US010627304B2

(12) United States Patent
Golshany et al.

(10) Patent No.: US 10,627,304 B2
(45) Date of Patent: Apr. 21, 2020

(54) OPTICAL DEVICE FOR ESTIMATING A CENTER OF GRAVITY OF AN AIRCRAFT

(71) Applicant: THE BOEING COMPANY, Chicago, IL (US)

(72) Inventors: Sina S. Golshany, Modesto, CA (US); Martin M. Withington, Seattle, WA (US); Lowell B. Campbell, Mukilteo, WA (US); David A. Rathke, Everett, WA (US); Tarek H. Elghoroury, Seattle, WA (US); Matthew W. Orr, Kirkland, WA (US); Gnanulan Canagaratna, Everett, WA (US)

(73) Assignee: THE BOEING COMPANY, Chicago, IL (US)

( * ) Notice: Subject to any disclaimer, the term of this patent is extended or adjusted under 35 U.S.C. 154(b) by 207 days.

(21) Appl. No.: 15/884,968

(22) Filed: Jan. 31, 2018

(65) Prior Publication Data

US 2019/0234825 A1  Aug. 1, 2019

(51) Int. Cl.
*G01M 1/12* (2006.01)
*G01G 23/36* (2006.01)
(Continued)

(52) U.S. Cl.
CPC ......... *G01M 1/125* (2013.01); *B64D 45/0005* (2013.01); *G01G 23/361* (2013.01); (Continued)

(58) Field of Classification Search
CPC ... G01M 1/125; B64D 45/0005; B64D 47/02; G01G 23/361; G01G 23/3721; (Continued)

(56) References Cited

U.S. PATENT DOCUMENTS 3,584,503 A * 6/1971 Senour ................... G01G 19/07
73/65.06
7,641,146 B2  1/2010 Wood et al.
(Continued)

FOREIGN PATENT DOCUMENTS

EP    0502811 A2   3/1992
EP    3267224 A1   1/2018
(Continued)

OTHER PUBLICATIONS

Extended European Search Report for Application No. 18211938.8 dated May 17, 2019, 7 pgs.

*Primary Examiner* — Lisa M Caputo
*Assistant Examiner* — Nigel H Plumb
(74) *Attorney, Agent, or Firm* — Moore IP Law

(57) ABSTRACT

A system includes a signal generator that is configured to generate a first electrical signal. The system also includes a light source configured to generate a light beam based on the first electrical signal. The light source is also configured to direct the light beam towards a structural member of an aircraft. The system also includes a photoelectric sensor configured to receive a reflected light beam and convert the reflected light beam to a second electrical signal. The reflected light beam corresponds to a portion of the light beam that is reflected from one or more optical reflectors coupled to the structural member. The system also includes circuitry configured to estimate a location of a center-of-gravity of the aircraft based on a timing difference between the first electrical signal and the second electrical signal.

20 Claims, 9 Drawing Sheets

(51) Int. Cl.
  *G01N 23/227* (2018.01)
  *G01G 23/37* (2006.01)
  *B64D 45/00* (2006.01)
  B64C 25/04 (2006.01)
  B64D 47/02 (2006.01)

(52) U.S. Cl.
  CPC ....... *G01G 23/3721* (2013.01); *G01N 23/227* (2013.01); *B64C 25/04* (2013.01); *B64D 47/02* (2013.01)

(58) Field of Classification Search
  CPC .... G01N 23/227; B64C 25/04; B64C 13/503; G01S 17/88; G01L 1/24
  See application file for complete search history.

(56) References Cited

U.S. PATENT DOCUMENTS

| | | |
|---|---|---|
| 8,042,765 B1 | 10/2011 | Nance |
| 9,798,004 B2 | 10/2017 | Soreide et al. |
| 2005/0007257 A1 | 1/2005 | Rast |

FOREIGN PATENT DOCUMENTS

| | | |
|---|---|---|
| WO | 2006024146 A1 | 3/2006 |
| WO | 2015088967 A1 | 6/2015 |
| WO | 2016011099 A1 | 1/2016 |

\* cited by examiner

OPTICAL DEVICE FOR ESTIMATING A CENTER OF GRAVITY OF AN AIRCRAFT

FIELD OF THE DISCLOSURE

The present disclosure is related to a device that estimates a location of a center-of-gravity of an aircraft.

BACKGROUND

A gross weight of an aircraft and a location of a center-of-gravity of the aircraft are estimated by an aircrew to ensure that the aircraft is compliant with regulations for safe operation. To accurately estimate the gross weight of the aircraft, the aircrew accounts for the gross weight of the aircraft when empty and unfueled, and the aircrew accounts for the weight of cargo and fuel. The center-of-gravity location is estimated based on the center-of-gravity location when the aircraft is empty and the approximate distribution of weight due to cargo and fuel. Because it is not practical to track the gross weight and the location of the center-of-gravity as conditions (e.g., loading and fueling) of the aircraft change, airlines apply curtailments (e.g., conservatisms) to an allowable gross weight and a center-of-gravity envelope to account for variations in the estimated gross weight and location of the center-of-gravity and the actual gross weight and location of the center-of-gravity.

The curtailments subtract from the designed capabilities of the aircraft and reduce operational flexibility and payload flexibility. For example, the maximum amount of weight that is permitted to be loaded onto the aircraft is decreased due to the curtailments.

SUMMARY

According to one implementation of the present disclosure, an aircraft includes a structural member and a signal generator that is configured to generate a first electrical signal. The aircraft also includes a light source configured to generate a light beam based on the first electrical signal. The light source is also configured to direct the light beam towards a reflector attached to the structural member. The aircraft also includes a photoelectric sensor configured to receive a reflected light beam and convert the reflected light beam to a second electrical signal. The reflected light beam corresponds to a portion of the light beam that is reflected from one or more optical reflectors coupled to the structural member. The aircraft also includes circuitry configured to estimate a location of a center-of-gravity of the aircraft based on a timing difference between the first electrical signal and the second electrical signal.

According to another implementation of the present disclosure, a method of obtaining aircraft information includes generating a first electrical signal. The method also includes generating a light beam based on the first electrical signal. The light beam is directed towards a structural member of an aircraft. The method also includes converting a reflected light beam to a second electrical signal. The reflected light beam corresponds to a portion of the light beam reflected from one or more optical reflectors coupled to the structural member. The method also includes estimating a location of a center-of-gravity of the aircraft based on a timing difference between the first electrical signal and the second electrical signal.

According to another implementation of the present disclosure, a system includes a signal generator that is configured to generate a first electrical signal. The system also includes a light source configured to generate a light beam based on the first electrical signal. The light source is also configured to direct the light beam towards a structural member of an aircraft. The system also includes a photoelectric sensor configured to receive a reflected light beam and convert the reflected light beam to a second electrical signal. The reflected light beam corresponds to a portion of the light beam that is reflected from one or more optical reflectors coupled to the structural member. The system also includes circuitry configured to estimate a location of a center-of-gravity of the aircraft based on a timing difference between the first electrical signal and the second electrical signal.

One advantage of the above-described implementation is that the location of a center-of-gravity of an aircraft (and in some implementations a weight of the aircraft) can be estimated using deformities in the aircraft's structures (e.g., a nose gear, a main landing gear, or both) as opposed to manually estimated by aircraft operators. As a result, operational flexibility and payload capability are increased due to weight estimations and center-of-gravity location estimations that are more accurate than manual estimations with curtailments. Thus, the maximum amount of weight that is permitted to be loaded onto the aircraft can be increased due to curtailment reduction. Additionally, the features, functions, and advantages that have been described can be achieved independently in various implementations or may be combined in yet other implementations, further details of which are disclosed with reference to the following description and drawings.

DETAILED DESCRIPTION

Particular embodiments of the present disclosure are described below with reference to the drawings. In the description, common features are designated by common reference numbers throughout the drawings.

The figures and the following description illustrate specific exemplary embodiments. It will be appreciated that those skilled in the art will be able to devise various arrangements that, although not explicitly described or shown herein, embody the principles described herein and are included within the scope of the claims that follow this description. Furthermore, any examples described herein are intended to aid in understanding the principles of the disclosure and are to be construed as being without limitation. As a result, this disclosure is not limited to the specific embodiments or examples described below, but by the claims and their equivalents.

The techniques described herein enable a device to estimate a location of a center-of-gravity of an aircraft using load-based deformities in the aircraft's fuselage or the aircraft's wing structure. The load-based deformities in the aircraft's fuselage or the aircraft's wing structure change a distance along an optical path between a light source and a light receiver. For example, a signal generator generates an electrical signal having a periodic waveform, and the light source generates a light beam based on the electrical signal. The light beam is focused and directed towards an optical reflector attached to a structural member of the aircraft's nose gear. The optical reflector includes one or more mirrors (or multiple prisms) arranged to facilitate reflection of the light beam with minimal loss of signal intensity. The reflected light beam is refocused and received by a photoelectric sensor (e.g., the light receiver). The photoelectric sensor converts the reflected light beam into a second electrical signal. Offtakes from the first electrical signal and the second electrical signal are converted into corresponding digital signals by a multi-channel analog-to-digital signal converter. Time differences between local maxima of the digital signals are computed and averaged to determine a distance traveled by the light beam. As described below, based on the averaged time differences, the device determines the location of the center-of-gravity of the aircraft. Additionally, a similar device may be installed with respect to a main landing gear of an aircraft and may work in conjunction with the device to estimate the weight of the aircraft.

Figure 1:
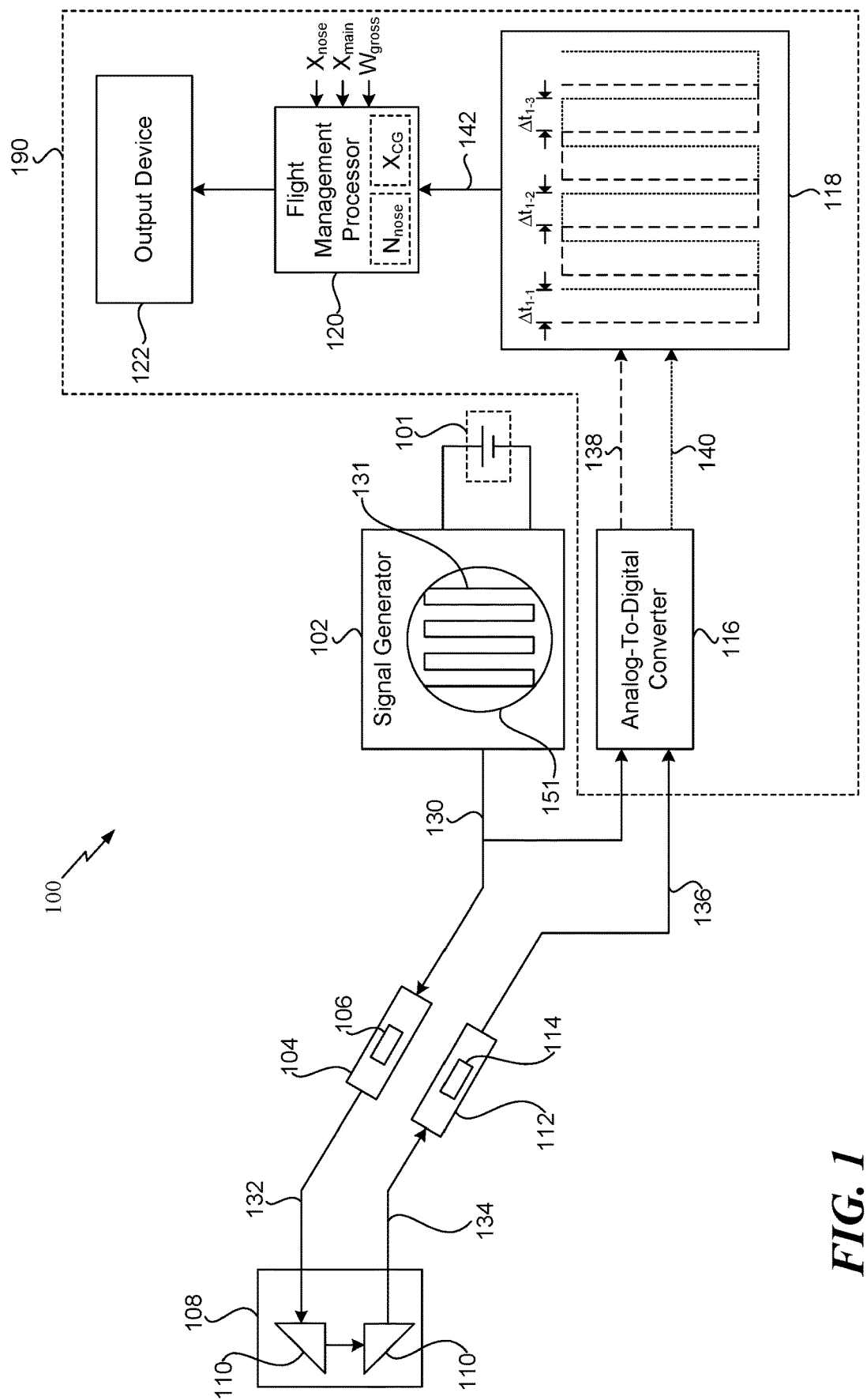
FIG. 1 is a diagram of a system that is operable to estimate a location of a center-of-gravity of an aircraft.

FIG. 1 is a diagram of a system 100 that is operable to obtain aircraft information. For example, as described below, the system 100 is operable to estimate a location of a center-of-gravity ($X_{CG}$) of an aircraft, such as an aircraft 300 depicted in FIG. 3. The system 100 includes a power source 101, a signal generator 102, a light source 104, a photoelectric sensor 112, and additional circuitry 190. The circuitry 190 includes an analog-to-digital converter 116, a signal offset processor 118, a flight management processor 120, and an output device 122. According to one implementation, one or more components of the system 100 are integrated on an aircraft 300 within proximity of a structural member 108 on the aircraft 300. As a non-limiting example, the structural member 108 corresponds to a portion of a nose gear of the aircraft 300, such as a nose gear 302 depicted in FIG. 3. As another non-limiting example, the structural member 108 corresponds to a portion of a main landing gear of the aircraft 300, such as a main landing gear 304 depicted in FIG. 3.

The power source 101 is coupled to the signal generator 102. According to one implementation, the power source 101 is a direct current power source. As a non-limiting example, the power source 101 includes a battery that provides power to the signal generator 102. The signal generator 102 is configured to generate a first electrical signal 130 having characteristics of a particular waveform 131. To illustrate, the signal generator 102 includes a waveform generator 151 that generates the particular waveform 131. The particular waveform 131 is a periodic waveform that has local maxima and local minima. The first electrical signal 130 has characteristics of the particular waveform 131 and has an amplitude that is based on the amount of power provided by the power source 101. For example, the first electrical signal 130 has a substantially identical phase as the particular waveform 131, a substantially identical period as the particular waveform 131, a substantially identical shape as the particular waveform 131, etc. An amplitude of a local maximum associated with the first electrical signal 130 and an amplitude of a local minimum associated with the first electrical signal 130 are based on the amount of power provided by the power source 101. For example, the amplitude of the local maximum increases as the amount of power provided by the power source 101 increases.

The first electrical signal 130 is provided to the light source 104 and to the analog-to-digital converter 116. The light source 104 is configured to generate a light beam 132 based on the first electrical signal 130. In a particular implementation, the light source 104 is a solid-state photon source that is capable of generating a consistent modulated signal having a relatively high degree of accuracy. According to one implementation, the light source 104 includes an optical direction element 106. For example, the optical direction element 106 can include a reflector (e.g., a mirror, a prism, etc.) that directs the light beam 132 towards a particular target. To illustrate, the optical direction element 106 is configured to direct the light beam 132 towards the structural member 108. Thus, the light source 104 generates the light beam 132 and directs the light beam 132 towards the structural member 108.

One or more optical reflectors 110 are coupled to the structural member 108. The optical reflectors 110 include one or more mirrors, one or more prisms, or a combination thereof. The optical reflectors 110 are coupled to the structural member 108 so that the reflected light beam 134 is directed towards the photoelectric sensor 112 and so that an optical path distance between the light source 104 and the photoelectric sensor 112 is dependent on an amount of deformation of the structural member 108. To illustrate, a first optical reflector may reflect the light beam 132 towards a second optical reflector, and the second optical reflector may reflect the light beam 132 towards the photoelectric sensor 112 as the reflected light beam 134. Thus, the reflected light beam 134 corresponds to a portion of the light beam 132 reflected from the one or more optical reflectors 110 coupled to the structural member 108. According to one implementation, additional optical reflectors (not shown) are used to extend the optical path distance between the light source 104 and the photoelectric sensor 112. For example, multiple mirrors can be used to fold the light beam 132 back and forth along the optical path to increase the optical path distance in order to increase measurement accuracy.

According to one implementation, the light beam 132 (e.g., an optical beam) is relayed through an optical medium. As a non-limiting example, the light beam 132 may be relayed through a fiber optic connection with floating joints on both ends that isolates the optical medium from deformations in the structural member 108. According to another implementation, the light beam 132 is relayed via a line-of-sight connection. The line-of-sight connection can be augmented by deflectors and splitters.

Figure 3:
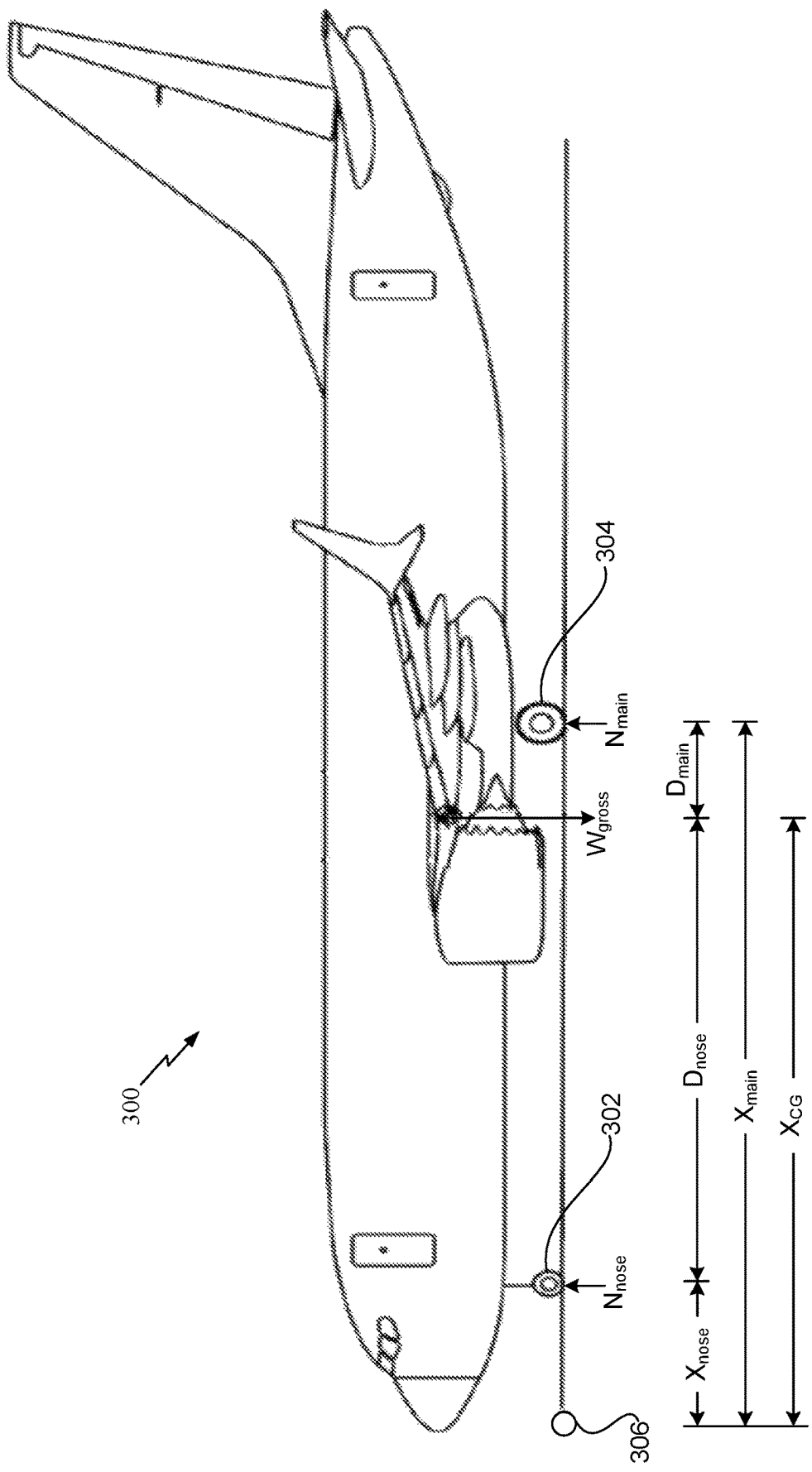
FIG. 3 is a diagram of the aircraft.

The amount of deflection or deformation of the structural member 108 is based on a load associated with the aircraft, such as the aircraft 300 of FIG. 3. As described below, deformations in the structural member 108 under load can be used to determine the location of the aircraft's 300 center-of-gravity ($X_{CG}$). To illustrate, deformations in the structural member 108 under load changes (e.g., increases or decreases) the amount of time between the light beam 132 reaching the structural member 108 and the reflected light beam 134 being received at the photoelectric sensor 112 as opposed to if the structural member 108 is not under load. Specifically, the distance the light beams 132, 134 travel between the light source 104 and the photoelectric sensor 112 increases or decreases based the deformation of the structural member 108. Thus, as the distance the light beams 132, 134 travel increases (or decreases), the amount of time required for the light to traverse between the light source 104 and the photoelectric sensor 112 also increases (or decreases) in direct correlation with the change in distance the light beams 132, 134 travel due to the deformations (e.g., which cause deflections) in the structural member 108.

The photoelectric sensor 112 is configured to receive the reflected light beam 134. Although the photoelectric sensor 112 is shown to include an optical direction element 114 in FIG. 1, in other implementations, the optical direction element 114 is separate from the photoelectric sensor 112. The optical direction element 114 can include a reflector (e.g., a mirror, a prism, etc.) that directs the light beam 132 towards a particular target. To illustrate, the optical direction element 114 is configured to direct the reflected light beam 134 towards the photoelectric sensor 112. After reception of the reflected light beam 134, the photoelectric sensor 112 is configured to convert the reflected light beam 134 into a second electrical signal 136. The second electrical signal 136 has a waveform with characteristics that are similar to the characteristics of the particular waveform 131 other than differences introduced due to the length of the optical path between the light source 104 and the photoelectric sensor 112. For example, the second electrical signal 136 has a substantially identical period as the particular waveform 131, a substantially identical shape as the particular waveform 131, etc. According to one implementation, the photoelectric sensor 112 (e.g., a high-sensitivity photoelectric sensor) has a relatively high refresh rate and has a high signal-to-noise ratio circuit that enables identification and measurement of signal property changes between the first electrical signal 130 and the second electrical signal 136. Because the electrical signals 130, 136 are sourced from different locations, there can be inherent phase offset due to signal latency. To correct for the inherent phase offset, a constant (or varying) phase shift may be applied to samples of the first electrical signal 130, the second electrical signal 136, or both. The second electric signal 136 is provided to the analog-to-digital converter 116.

The analog-to-digital converter 116 is configured to convert the first electrical signal 130 (e.g., an analog signal) into a first digital signal 138. The first digital signal 138 has properties associated with the waveform of the first electrical signal 130. Additionally, the analog-to-digital converter 116 is configured to convert the second electrical signal 136 (e.g., an analog signal) into a second digital signal 140. The second digital signal 140 has properties associated with the waveform of the second electrical signal 136. The first digital signal 138 and the second digital signal 140 are provided to the signal offset processor 118.

The signal offset processor 118 is configured to determine timing differences ($\Delta t_{1-1}$, $\Delta t_{1-2}$, $\Delta t_{1-3}$) between the first digital signal 138 and the second digital signal 140. Each timing difference ($\Delta t_{1-1}$, $\Delta t_{1-2}$, $\Delta t_{1-3}$) corresponds to an amount of time between a local maximum of the first digital signal 138 and a corresponding local maximum of the second digital signal 140. The first digital signal 138 is illustrated within the signal offset processor 118 using a dashed-line with relatively large dashes, and the second digital signal 140 is illustrated within the signal offset processor 118 using a dashed-line with smaller dashes. The signal offset processor 118 is configured to determine a first time, such as a first time 206 in FIG. 2, that the first digital signal 138 attains a local maximum. The signal offset processor 118 is also configured to determine a corresponding second time, such as a second time 212 in FIG. 2, that the second digital signal 140 attains a local maximum. A first timing difference ($\Delta t_{1-1}$) corresponds to the amount of time (e.g., the difference) between the first time and the second time. In a similar manner, a timing difference ($\Delta t_{1-2}$) corresponds to the amount of time between the next local maximum of the digital signals 138, 140, and a timing difference ($\Delta t_{1-3}$) corresponds to the amount of time between the following local maximum of the digital signals 138, 140. The timing differences ($\Delta t_{1-1}$, $\Delta t_{1-2}$, $\Delta t_{1-3}$) are based on the amount of time between generation of the first electrical signal 130 and conversion of the reflected light beam 134 is based on an amount of deflection of the structural member 108 due a load associated with the aircraft 300. Operations of the signal offset processor 118 are described in greater detail with respect to FIG. 2.

Figure 2:
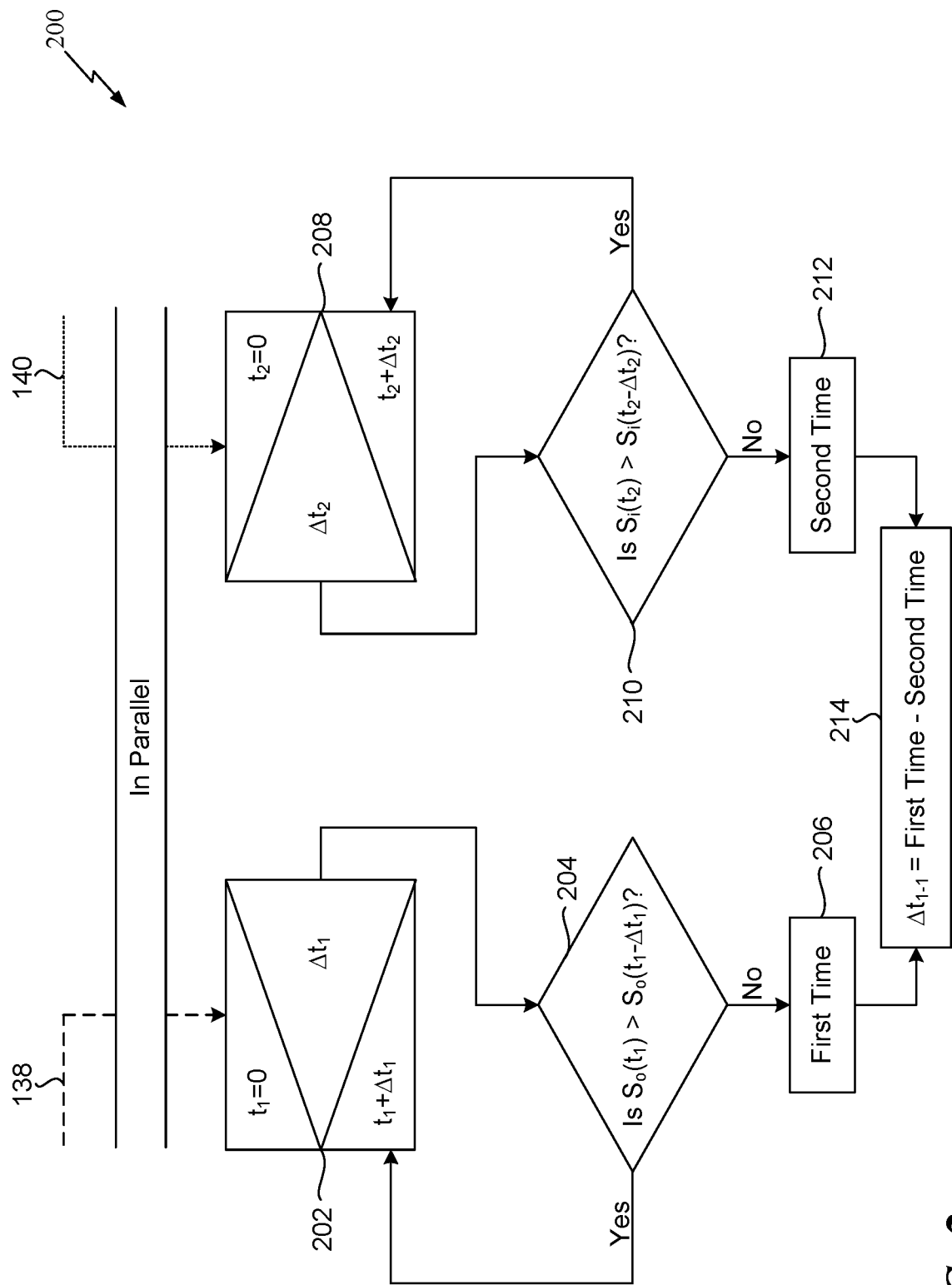
FIG. 2 is a diagram of a system that is operable to determine timing differences between signals used to estimate the location of the center-of-gravity of the aircraft.

Referring to FIG. 2, a flow chart 200 for determining the timing differences ($\Delta t_{1-1}$, $\Delta t_{1-2}$, $\Delta t_{1-3}$) is shown. Operations illustrated in FIG. 2 are performed by the signal offset processor 118 of FIG. 1. The signal offset processor 118 is operable to identify the first time 206 that the first digital signal 138 attains a local maximum and to identify the corresponding second time 212 that the second digital signal 140 attains a local maximum. Thus, signal processing operations on the digital signals 138, 140 are performed in parallel. Although the shapes of the digital signals 138, 140 are arbitrary, the signals 138, 140 are periodic and have range variations in intensity that are large enough to be filtered from system noise.

The first digital signal 138 is provided to a processing block 202 at a current test time ($t_1=0$). The processing block 202 is configured to sample the first digital signal 138 at the current test time ($t_1=0$). A decision block 204 compares the amplitude $S_o(t_1)$ of the first digital signal 138 at the current test time ($t_1$) to the amplitude $S_o(t_1-\Delta t_1)$ of the first digital signal 138 at a previous test time ($t_1-\Delta t_1$). If the amplitude $S_o(t_1)$ of the first digital signal 138 is greater than the amplitude $S_o(t_1-\Delta t_1)$ of the first digital signal 138 at a previously sampled test time ($t_1-\Delta t_1$), the processing block 202 samples the first digital signal 138 at an updated current test time ($t_1=t_1+\Delta t_1$). The process is repeated until the decision block 204 determines the amplitude $S_o(t_1)$ of the first digital signal 138 at the current test time ($t_1$) is not greater than the amplitude $S_o(t_1-\Delta t_1)$ of the first digital signal 138 at a previously sampled test time ($t_1-\Delta t_1$). The current test time ($t_1$) is stored as the first time 206 based on a determination that the amplitude $S_o(t_1)$ is not greater than (e.g., less than or equal to) the amplitude $S_o(t_1-\Delta t_1)$, indicating that the first digital signal 138 has a attained a local maximum.

In a similar manner, the second digital signal 140 is provided to a processing block 208 at a current test time ($t_2=0$). The processing block 208 is configured to sample the second digital signal 140 at the current test time ($t_2=0$). A decision block 210 compares the amplitude $S_i(t_2)$ of the second digital signal 140 at the current test time ($t_2$) to the amplitude $S_i(t_2-\Delta t_2)$ of the second digital signal 140 at a previous test time ($t_2-\Delta t_2$). If the amplitude $S_i(t_2)$ of the second digital signal 140 is greater than the amplitude $S_i(t_2-\Delta t_2)$ of the second digital signal 140 at a previously sampled test time ($t_2-\Delta t_2$), the processing block 208 samples the second digital signal 140 at an updated current test time ($t_2=t_2+\Delta t_2$). The process is repeated until the decision block 210 determines the amplitude $S_i(t_2)$ of the second digital signal 140 at the current test time ($t_2$) is not greater than the amplitude $S_i(t_2-\Delta t_2)$ of the second digital signal 140 at a previously sampled test time ($t_2-\Delta t_2$). The current test time ($t_2$) is stored as the second time 212 based on a determination that the amplitude $S_i(t_2)$ is not greater than (e.g., less than or equal to) the amplitude $S_i(t_2-\Delta t_2)$, indicating that the second digital signal 140 has attained a local maximum.

At block 214, the system 200 determines the first timing difference ($\Delta t_{1-1}$) based on the difference (e.g., the absolute value of the difference) of the first time 206 and the second time 212. The process described with respect to FIG. 2 is repeated to determine the other timing differences ($\Delta t_{1-2}$, $\Delta t_{1-3}$). Thus, the system 200 receives and processes the digital signals 138, 140 in a continuous manner.

Referring back to FIG. 1, the signal offset processor 118 is configured to generate a timing offset signal 142 that indicates the timing differences ($\Delta t_{1-1}$, $\Delta t_{1-2}$, $\Delta t_{1-3}$). The timing offset signal 142 is provided to the flight management processor 120. The flight management processor 120 is configured to estimate the location of the center-of-gravity ($X_{CG}$) of the aircraft 300 based on the timing differences ($\Delta t_{1-1}$, $\Delta t_{1-2}$, $\Delta t_{1-3}$) indicated by the timing offset signal 142 and other information associated with the aircraft 300. Operations of the flight management processor 120 are described in conjunction with the aircraft 300 depicted in FIG. 3.

A reaction force ($N_{nose}$) of the nose gear 302 (e.g., the nose landing gear) is determined (e.g., calculated) by the flight management processor 120 based on the timing differences ($\Delta t_{1-1}$, $\Delta t_{1-2}$, $\Delta t_{1-3}$). To illustrate, the flight management processor 120 is configured to determine an average ($\Delta T$) of the timing differences ($\Delta t_{1-1}$, $\Delta t_{1-2}$, $\Delta t_{1-3}$) over a time interval. Based on the average ($\Delta T$), the flight management processor 120 is configured to determine the reaction force ($N_{nose}$). For example, the flight management processor 120 may use a look-up table to determine the reaction force ($N_{nose}$) based on the average ($\Delta T$). To illustrate, for a particular average ($\Delta T$), a corresponding value of a reaction force ($N_{nose}$) is listed in the look-up table and stored in memory. The value of the reaction force ($N_{nose}$) may be determined via interpolation if there is not a value that corresponds to the particular average ($\Delta T$). According to one implementation, the nose gear 302 is the structural member 108.

A location ($X_{nose}$) of the nose gear 302 along a horizontal axis relative to a reference point 306 (e.g., the front of the aircraft 300) is provided to the flight management processor 120, a location ($X_{main}$) of the main landing gear 304 along the horizontal axis relative to the reference point 306 is provided to the flight management processor 120, and a gross weight vector ($W_{gross}$) of f the aircraft 300 indicating the ramp weight of the aircraft 300 is provided to the flight management processor 120. Based on the additional information, the flight management processor 120 can estimate the location of the center-of-gravity ($X_{CG}$) using the following equation:

$$X_{CG} = \frac{N_{nose}X_{nose} + (W_{gross} - N_{nose})X_{main}}{W_{gross}}$$

In FIG. 3, $D_{nose}$ indicates the distance between the nose gear 302 and the center-of-gravity ($X_{CG}$), and $D_{main}$ indicates the distance between main landing gear 304 and the center-of-gravity ($X_{CG}$).

According to another implementation, the average ($\Delta T$) of the timing differences ($\Delta t_{1-1}$, $\Delta t_{1-2}$, $\Delta t_{1-3}$) and the weight of the aircraft 300 (e.g., the gross weight vector ($W_{gross}$)) are inputs to a look-up table used to estimate the location of the center of gravity ($X_{CG}$). For example, the flight management processor 120 is configured to use a table lookup procedure to relate the location of the center of gravity ($X_{CG}$) to the gross weight vector ($W_{gross}$) and the average ($\Delta T$) of the timing differences ($\Delta t_{1-1}$, $\Delta t_{1-2}$, $\Delta t_{1-3}$). According to some implementations, the flight management processor 120 interpolates between tabulated values of the look-up table if the gross weight vector ($W_{gross}$) and the average ($\Delta T$) of the timing differences ($\Delta t_{1-1}$, $\Delta t_{1-2}$, $\Delta t_{1-3}$) are not in the look-up table. According to another implementation, the average ($\Delta T$) of the timing differences ($\Delta t_{1-1}$, $\Delta t_{1-2}$, $\Delta t_{1-3}$) and the gross weight vector ($W_{gross}$) are inputs to an empirical function (or semi-empirical function) that is used to solve for the location of the center of gravity ($X_{CG}$). For example, the empirical function may be expressed as:

$$X_{CG} = f(\Delta \overline{T}, W_{gross})$$

The location of the center-of-gravity ($X_{CG}$) is provided to the output device 122 to inform on-board crew, ground crew technicians, or dispatchers of aircraft conditions. As a non-limiting example, the output device 122 may generate a tip-up alarm to indicate that the location of the center-of-gravity ($X_{CG}$) is too far towards the rear of the aircraft 300, which may result in the aircraft 300 nose tipping up. As another example, the location of the center-of-gravity can be used by the flight management processor 120 to set (or record) flight information, such as a trim setting. As another non-limiting example, the output device 122 may correspond to a cockpit display to inform the on-board crew (e.g., the pilots) of the location of the center-of-gravity ($X_{CG}$). As another non-limiting example, the output device 122 may correspond to a remote device to inform the dispatch operators of the location of the center-of-gravity ($X_{CG}$). Thus, the output device 122 provides graphical data, numerical data, or both, to the flight crew and the ground crew.

The techniques described with respect to FIGS. 1-3 enable deformations in an aircraft's primary structure under load to be used to estimate the location of the aircraft's center-of-gravity ($X_{CG}$). For example, deformations in the structural member 108 under load change (e.g., increase) the amount of time between generation of the first electrical signal 130 and conversion of the reflected light beam 134 as opposed to if the structural member 108 is not under load. The change in the amount of time is based on changes in the distance that the light beam 132 travels due to the deformations in the structural member 108. Using the change in the amount of time and the aircraft's weight, the flight management processor 120 estimates the location of the aircraft's center-of-gravity ($X_{CG}$).

Certain ramp slopes may vary as much as a two-degree incline from level or a two-degree decline from level. According to some implementations, one or more measuring units (e.g., onboard gyroscopes) are configured to measure the pitch attitude of the aircraft 300 to enable the system 100 to determine the location of the center-of-gravity ($X_{CG}$) on a variety of ramp slopes. Additionally, the temperature can affect deflection of the structural member 108 and can affect optical path length. Thus, according to some implementations, temperature-sensors are configured to measure the ambient temperature near the aircraft 300, and the measured temperature is accounted for during determination of the location of the center-of-gravity ($X_{CG}$). Adjustments to the location of the center-of-gravity ($X_{CG}$) based on the measured temperature can be determined using a look-up table. To illustrate, for a particular temperature, a corresponding adjustment to the location of the center-of-gravity ($X_{CG}$) is listed in the look-up table and stored in memory. The adjustment may be determined via interpolation if there is not a listed adjustment that corresponds to the particular temperature. Alternatively, the adjustments to the location of the center-of-gravity ($X_{CG}$) may be determined using a mathematical function.

Figure 4:
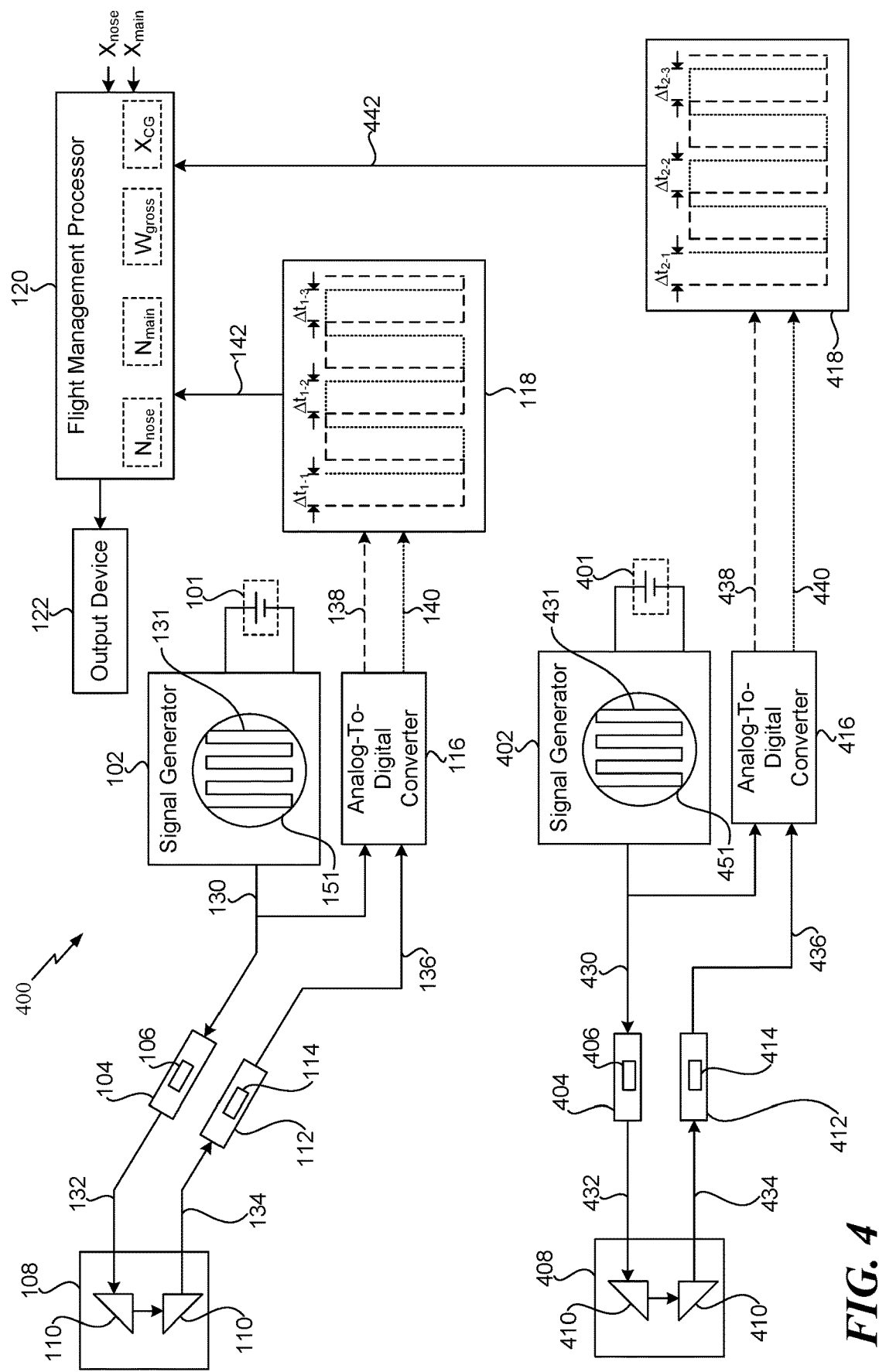
FIG. 4 is a diagram of a system that is operable to estimate the location of the center-of-gravity of the aircraft and to estimate a weight of the aircraft.

FIG. 4 is a diagram of another system 400 that is operable to obtain aircraft information. The system 400 is operable to estimate the location of the center-of-gravity of an aircraft (e.g., the aircraft 300) and operable to estimate a weight of the aircraft. The system 400 includes components that are included in system 100 of FIG. 1, such as the power source 101, the signal generator 102, the light source 104, the structural member 108, the photoelectric sensor 112, the analog-to-digital converter 116, and the signal offset processor 118. The components operate in a substantially similar manner as described above. For example, the components 101-118 operate to generate the timing offset signal 142 that indicates the timing differences ($\Delta t_{1-1}$, $\Delta t_{1-2}$, $\Delta t_{1-3}$). The system 400 also includes a power source 401, a signal generator 402, a light source 404, a structural member 408, a photoelectric sensor 412, an analog-to-digital converter 416, and a signal offset processor 418. According to the illustration in FIG. 4, the structural member 108 corresponds to a portion of the nose gear 302 of FIG. 3, and the structural member 408 corresponds to a portion of the main landing gear 304 of FIG. 3.

The power source 401 is coupled to the signal generator 402. According to one implementation, the power source 401 is a direct current power source. As a non-limiting example, the power source 401 includes a battery that provides power to the signal generator 402. The signal generator 402 is configured to generate a third electrical signal 430 having a particular waveform 431. To illustrate, the signal generator 402 includes a waveform generator 451 that generates the particular waveform 431. The particular waveform 431 is a periodic waveform that has local maxima and local minima. The third electrical signal 430 has characteristics of the particular waveform 431 and has an amplitude that is based on the amount of power provided by the power source 401. For example, the third electrical signal 430 has a substantially identical phase as the particular waveform 431, a substantially identical period as the particular waveform 431, a substantially identical shape as the particular waveform 431, etc. An amplitude of a local maximum associated with the third electrical signal 430 and an amplitude of a local minimum associated with the third electrical signal 430 is based on the amount of power provided by the power source 401. For example, the amplitude of the local maximum increases as the amount of power provided by the power source 401 increases.

The third electrical signal 430 is provided to the light source 404 and to the analog-to-digital converter 416. The light source 404 is configured to generate a second light beam 432 based on the third electrical signal 430. According to one implementation, the light source 404 includes an optical direction element 406. The optical direction element 406 is configured to direct the second light beam 432 towards the structural member 408. Thus, the light source 404 generates the second light beam 432 and directs the second light beam 432 towards the structural member 408.

One or more optical reflectors 410 are coupled to the structural member 408. The optical reflectors 410 are coupled to the structural member 408 so that the second reflected light beam 434 is directed towards the photoelectric sensor 412 and so that an optical path distance between the light source 404 and the photoelectric sensor 412 is dependent on an amount of deformation of the structural member 408. To illustrate, a first optical reflector (of the optical reflectors 410) may reflect the second light beam 432 towards a second optical reflector (of the optical reflectors 410), and the second optical reflector may reflect the second light beam 432 towards the photoelectric sensor 412 as the second reflected light beam 434. Thus, the second reflected light beam 434 corresponds to a portion of the second light beam 432 reflected from the plurality of optical reflectors 410 coupled to the structural member 408. According to one implementation, additional optical reflectors (not shown) are to extend the optical path distance between the light source 404 and the photoelectric sensor 412.

The photoelectric sensor 412 is configured to receive the second reflected light beam 434. Although the photoelectric sensor 412 is shown to include an optical direction element 414 in FIG. 4, in other implementations, the optical direction element 414 is separate from the photoelectric sensor 412. The optical direction element 414 is configured to direct the second reflected light beam 434 towards the photoelectric sensor 412. After reception of the second reflected light beam 434, the photoelectric sensor 412 is configured to convert the second reflected light beam 434 into a fourth electrical signal 436. The fourth electrical signal 436 has a waveform with characteristics that are similar to the characteristics of the particular waveform 431 other than differences introduced due to the length of the optical path between the light source 404 and the photoelectric sensor 412. For example, the fourth electrical signal 436 has a substantially identical phase as the particular waveform 431, a substantially identical period as the particular waveform 431, a substantially identical shape as the particular waveform 431, etc. The fourth electric signal 436 is provided to the analog-to-digital converter 416.

The analog-to-digital converter 416 is configured to convert the third electrical signal 430 (e.g., an analog signal) into a third digital signal 438. The third digital signal 438 has properties associated with the waveform of the third electrical signal 430. Additionally, the analog-to-digital converter 416 is configured to convert the fourth electrical signal 436 (e.g., an analog signal) into a fourth digital signal 440. The fourth digital signal 440 has properties associated with the waveform of the fourth electrical signal 436. The third digital signal 438 and the fourth digital signal 440 are provided to the signal offset processor 418.

The signal offset processor 418 operates in a similar manner as the signal offset processor 118. For example, the signal offset processor 418 is configured to determine timing differences ($\Delta t_{2-1}$, $\Delta t_{2-2}$, $\Delta t_{2-3}$) between the third digital signal 438 and the fourth digital signal 440. To illustrate, the signal offset processor 418 is configured to determine a third time that the third digital signal 438 attains a local maximum and to determine a fourth time that the fourth digital signal 440 attains a corresponding local maximum. A timing difference ($\Delta t_{2-1}$) corresponds to the amount of time (e.g., the difference) between the third time and the fourth time. In a similar manner, a timing difference ($\Delta t_{2-2}$) corresponds to the amount of time between the next local maximum of the digital signals 438, 440, and a timing difference ($\Delta t_{2-3}$) corresponds to the amount of time between the following local maximum of the digital signals 438, 440. The timing differences ($\Delta t_{2-1}$, $\Delta t_{2-2}$, $\Delta t_{2-3}$) are based on the amount of time between generation of the third electrical signal 430 and conversion of the second reflected light beam 434 is based on an amount of deflection of the structural member 408 due the load associated with the aircraft 300. The signal offset processor 418 is configured to generate a timing offset signal 442 that indicates the timing differences ($\Delta t_{2-1}$, $\Delta t_{2-2}$, $\Delta t_{2-3}$). The timing offset signal 442 is provided to the flight management processor 120.

The flight management processor 120 is configured to estimate the location of the center-of-gravity ($X_{CG}$) of the aircraft 300 and the weight ($W_{gross}$) of the aircraft 300 based on the timing differences ($\Delta t_{1-1}$, $\Delta t_{1-2}$, $\Delta t_{1-3}$) indicated by the timing offset signal 142, the timing differences ($\Delta t_{2-1}$, $\Delta t_{2-2}$, $\Delta t_{2-3}$) indicated by the timing offset signal 442, and other information associated with the aircraft 300. Prior to estimation of the center-of-gravity ($X_{CG}$) and the weight ($W_{gross}$), the flight management processor 120 determines a reaction force ($N_{main}$) of the main landing gear 304 (e.g., the structural member 408). The reaction force ($N_{nose}$) of the nose gear 302 (e.g., the structural member 108) is determined in a similar manner as described with respect to FIG. 1. The reaction force ($N_{main}$) of the main landing gear 304 is determined (e.g., calculated) by the flight management processor 120 based on the timing differences ($\Delta t_{2-1}$, $\Delta t_{2-2}$, $\Delta t_{2-3}$). To illustrate, the flight management processor 120 is configured to determine an average ($\Delta T$) of the timing differences ($\Delta t_{2-1}$, $\Delta t_{2-2}$, $\Delta t_{2-3}$) over a time interval. Based on the average ($\Delta T$), the flight management processor 120 is configured to determine the reaction force ($N_{main}$). For example, the flight management processor 120 may use a look-up table to determine the reaction force ($N_{main}$) based on the average ($\Delta T$). To illustrate, for a particular average ($\Delta T$), a corresponding value of a reaction force ($N_{main}$) is listed in the look-up table and stored in memory. The value of the reaction force ($N_{main}$) may be determined via interpolation if there is not a value that corresponds to the particular average ($\Delta T$).

The flight management processor 120 is configured to estimate the weight ($W_{gross}$) of the aircraft 300 based on the reaction force ($N_{nose}$) of the nose gear 302 and the reaction force ($N_{main}$) of the main landing gear 304. For example, the weight ($W_{gross}$) of the aircraft 300 is determined using the following equation:

$$W_{gross} = N_{nose} + N_{main}$$

Additionally, the flight management processor 120 is configured to estimate the location of the center-of-gravity ($X_{CG}$) of the aircraft 300. To estimate the location of the center-of-gravity ($X_{CG}$) of the aircraft 300, the location ($X_{nose}$) of the nose gear 302 and the location ($X_{main}$) of the main landing gear 304 are provided to the flight management processor 120. Based on the additional information, the flight management processor 120 may estimate the location of the center-of-gravity ($X_{CG}$) using the following equation:

$$X_{CG} = \frac{N_{nose} X_{nose} + (N_{main}) X_{main}}{N_{main} + N_{nose}}$$

In addition to the location of the center-of-gravity ($X_{CG}$), the weight ($W_{gross}$) is provided to the output device 122 to inform on-board crew, ground crew, technicians, or dispatchers of weight conditions of the aircraft 300. Based on the weight conditions, the on-board crew and the ground crew may be notified by output device 122 whether the aircraft 300 is too heavy.

Thus, the techniques described with respect to FIG. 4 enable deformations in an aircraft's primary structure under load to be used to estimate the location of the aircraft's 300 center-of-gravity ($X_{CG}$) and weight ($W_{gross}$). The location of the center-of-gravity ($X_{CG}$) and the weight ($W_{gross}$) may be presented to personnel associated with the aircraft 300 for safety checks. To illustrate, the location of the center-of-gravity ($X_{CG}$) can be used by flight management processor 120 to set flight information, such as a trim setting. Additionally, the weight of the aircraft 300 can be used to estimate fuel consumption of the flight. Additionally, operational flexibility and payload capability are increased due to weight estimations and center-of-gravity location estimations that are more accurate than manual estimations with curtailments.

Figure 5A:
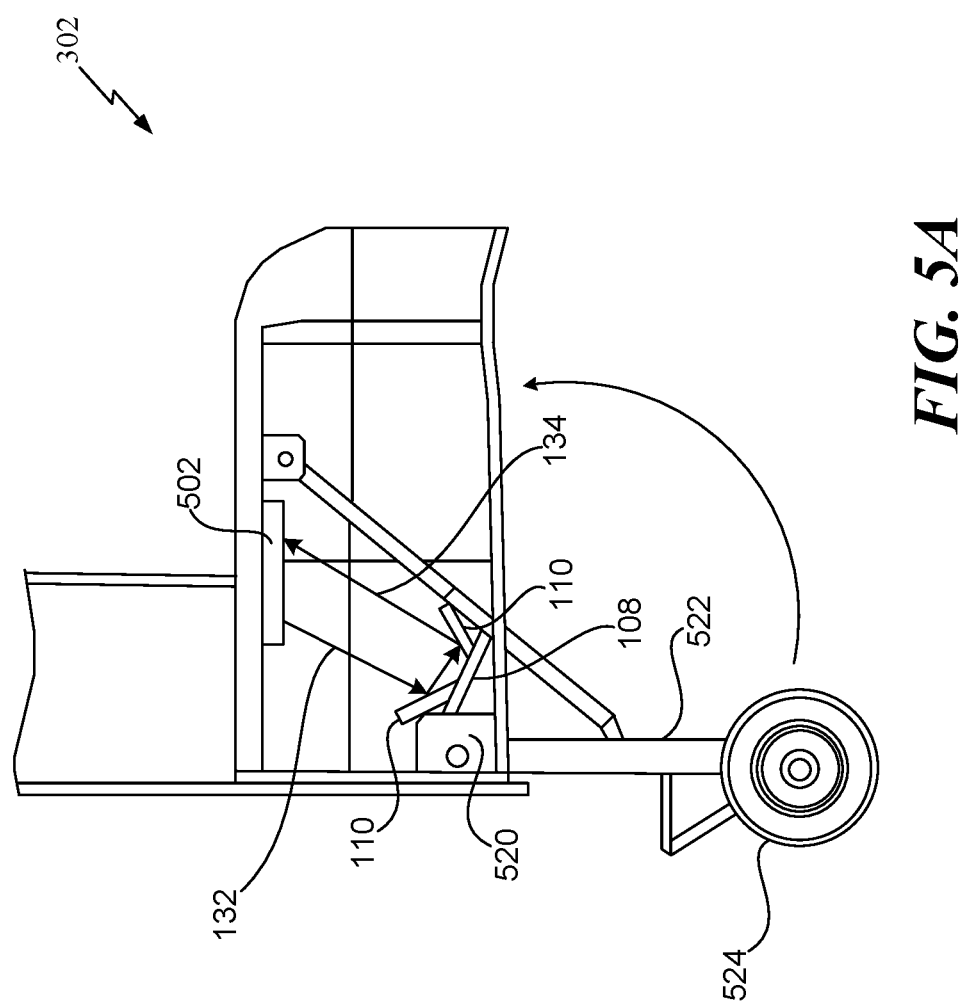
FIG. 5A is a diagram of an aircraft information estimation system integrated with a structural member of the aircraft.

Referring to FIG. 5A, a diagram of the nose gear 302 is shown. The nose gear 302 includes a strut fitting 520 that is coupled to a gear strut 522, and a wheel 524 that is coupled to the gear strut 522. If the wheel 524 is "released", the gear strut 522 is rotated at the strut fitting 520 such that the gear strut 522 is in a vertical position and the wheel 524 is positioned to touch the ground. If the wheel 524 is "unreleased", the gear strut 522 is rotated at the strut fitting 520 such that the gear strut 522 is in a horizontal position and the wheel 524 is positioned within a cavity of the nose gear 302.

An aircraft information estimation system 502 is attached (e.g., coupled) to a housing of the nose gear 302. The aircraft information estimation system 502 includes the power source 101, the signal generator 102, the light source 104, the photoelectric sensor 112, the analog-to-digital converter 116, the signal offset processor 118, and the flight management processor 120. According to one implementation, the output device 122 is included in the aircraft information estimation system 502.

The structural member 108 is coupled to the strut fitting 520 and is subject to deformation based on the load, and the optical reflectors 110 are coupled to the structural member 108. The aircraft information estimation system 502 directs the light beam 132 towards the optical reflectors 110, and the light beam 132 is reflected along the optical reflectors 110 to the aircraft information estimation system 502 as the reflected light beam 134.

Deformations in the structural member 108 under load are used to determine the location of the aircraft's 300 center-of-gravity ($X_{CG}$). To illustrate, deformations in the structural member 108 under load change (e.g., increase or decrease) the amount of time between the light beam 132 reaching the optical reflectors 110 and the reflected light beam 134 reaching the aircraft information estimation system 502 as opposed to if the structural member 108 is not under load. The change in the amount of time is based on additional lengths that the light beam 132 travels due to the deformations (e.g., which cause deflections) in the structural member 108.

Figure 5B:
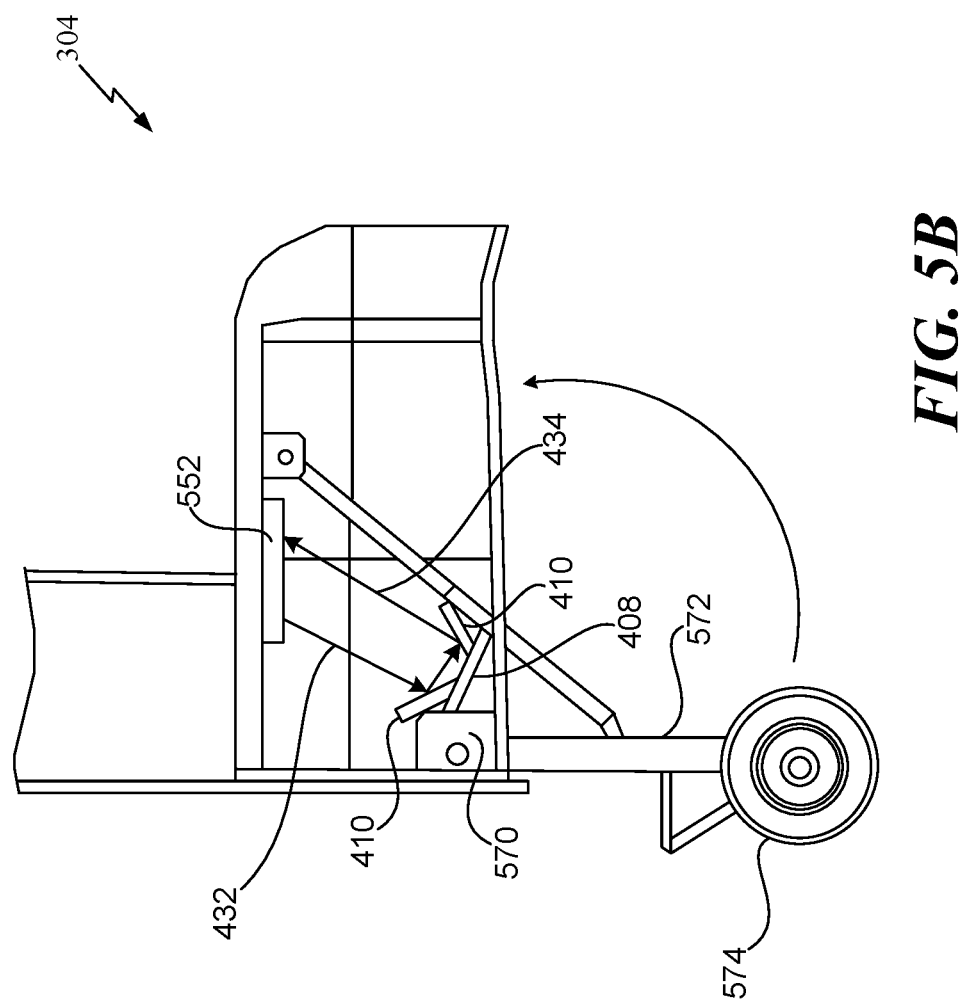
FIG. 5B is a diagram of an aircraft information estimation system integrated with another structural member of the aircraft.

Referring to FIG. 5B, a diagram of the main landing gear 304 is shown. The main landing gear 304 includes a strut fitting 570 that is coupled to a gear strut 572, and a wheel 574 that is coupled to the gear strut 572. If the wheel 574 is "released", the gear strut 572 is rotated at the strut fitting 570 such that the gear strut 572 is in a vertical position and the wheel 574 is positioned to touch the ground. If the wheel 574 is "unreleased", the gear strut 572 is rotated at the strut fitting 570 such that the gear strut 572 is in a horizontal position and the wheel 574 is positioned within a cavity of the main landing gear 304.

An aircraft information estimation system 552 is attached (e.g., coupled) to a housing of the main landing gear 304. The aircraft information estimation system 552 includes the power source 401, the signal generator 402, the light source 404, the photoelectric sensor 412, the analog-to-digital converter 416, the signal offset processor 418, and the flight management processor 120. According to one implementation, the output device 122 is included in the aircraft information estimation system 552.

The structural member 408 is coupled to the strut fitting 570 and is subject to deformation based on the load, and the optical reflectors 410 are coupled to the structural member 408. The aircraft information estimation system 552 directs the light beam 432 towards the optical reflectors 410, and the light beam 432 is reflected along the optical reflectors 410 to the aircraft information estimation system 552 as the reflected light beam 434.

Deformations in the structural member 408 under load are used to determine the location of the aircraft's 300 center-of-gravity ($X_{CG}$) and to determine the weight of the aircraft 300. To illustrate, deformations in the structural member 408 under load change (e.g., increase or decrease) the amount of time between the light beam 432 reaching the optical reflectors 410 and the reflected light beam 434 reaching the aircraft information estimation system 552 as opposed to if the structural member 408 is not under load. The change in the amount of time is based on additional lengths that the light beam 432 travels due to the deformations (e.g., which cause deflections) in the structural member 408.

Figure 6:
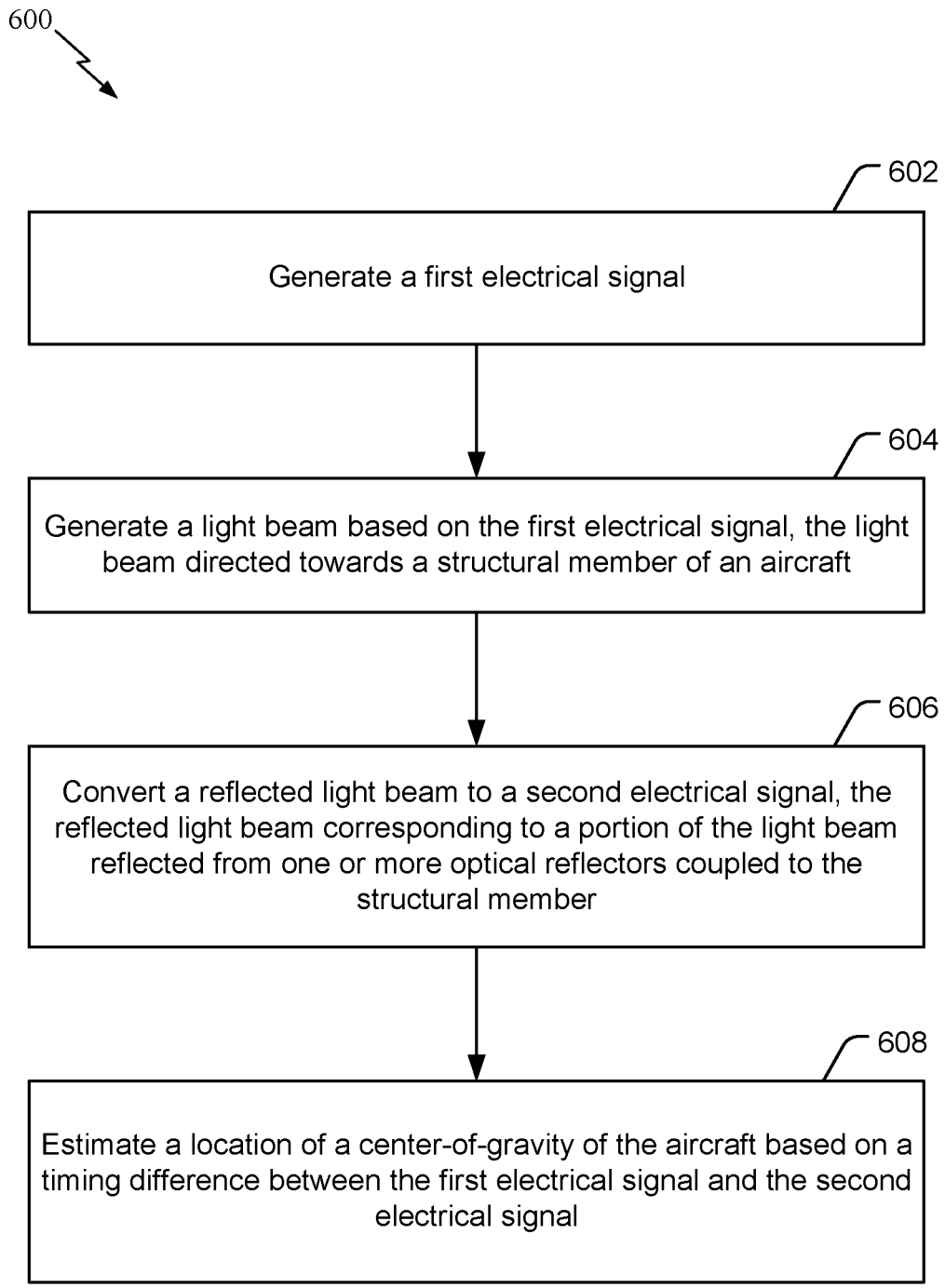
FIG. 6 is a flow chart of a method for estimating a location of a center-of-gravity of an aircraft.

Referring to FIG. 6, a method 600 for estimating a location of a center-of-gravity of an aircraft is shown. The method 600 is performed by the one or more components of the system 100 of FIG. 1, the system 200 of FIG. 2, one or more components of the system 400 of FIG. 4, or a combination thereof.

The method 600 includes generating a first electrical signal, at 602. For example, referring to FIG. 1, the signal generator 102 generates the first electrical signal 130 having the characteristics associated with the particular waveform 131. To illustrate, the first electrical signal 130 has a substantially identical phase as the particular waveform 131, a substantially identical period as the particular waveform 131, a substantially identical shape as the particular waveform 131, etc. The particular waveform 131 is a periodic waveform that has local maxima and local minima.

The method 600 also includes generating a light beam based on the first electrical signal, at 604. The light beam is directed towards a structural member of an aircraft. For example, referring to FIG. 1, the light source 104 generates the light beam 132 based on the first electrical signal 130. In a particular implementation, the light source 104 is a solid-state photon source that is capable of generating a consistent modulated signal having a relatively high degree of accuracy. The optical direction element 106 directs the light beam 132 towards the structural member 108.

The method 600 also includes converting a reflected light beam to a second electrical signal, at 606. The reflected light beam corresponds to a portion of the light beam reflected from one or more optical reflectors coupled to the structural member. For example, referring to FIG. 1, one or more mirrors (e.g., optical reflectors 110) are coupled to the structural member 108 to reflect the light beam 132 along the structural member 108 as the reflected light beam 134. The one or more optical reflectors 110 are coupled in such a manner that the reflected light beam 134 is directed towards the photoelectric sensor 112. The photoelectric sensor 112 converts the reflected light beam 134 into the second electrical signal 136. The second electrical signal 136 has a waveform with characteristics that are similar to the characteristics of the particular waveform 131 other than differences introduced due to the length of the optical path between the light source 104 and the photoelectric sensor 112.

The method 600 also includes estimating a location of a center-of-gravity of the aircraft based on a timing difference between the first electrical signal and the second electrical signal, at 608. For example, the analog-to-digital converter 116 converts the first electrical signal 130 into the first digital signal 138 and converts the second electrical signal 136 into the second digital signal 140. The signal offset processor 118 determines the timing differences ($\Delta t_{1-1}$, $\Delta t_{1-2}$, $\Delta t_{1-3}$) between the first digital signal 138 and the second digital signal 140, and the flight management processor 120 estimates the location of the center-of-gravity ($X_{CG}$) based on the average ($\Delta T$) of the timing differences ($\Delta t_{1-1}$, $\Delta t_{1-2}$, $\Delta t_{1-3}$) over a time interval.

According to one implementation, the method 600 includes generating a third electrical signal. The method 600 may also include generating a second light beam based on the third electrical signal. The second light beam is directed towards a second structural member of the aircraft. The method 600 may also include converting a second reflected light beam to a fourth electrical signal. The second reflected light beam corresponds to a portion of the second light beam reflected from second one or more optical reflectors coupled to the second structural member. The method 600 may also include estimating a weight of the aircraft based on the timing difference and a second timing difference between the third electrical signal and the fourth electrical signal.

The method 600 enables deformations in an aircraft's primary structure under load to be used to estimate the location of the aircraft's 300 center-of-gravity ($X_{CG}$), the aircraft's 300 weight ($W_{gross}$), or both. The location of the center-of-gravity ($X_{CG}$) and the weight ($W_{gross}$) may be presented to personnel associated with the aircraft 300 for safety checks. Additionally, operational flexibility and payload capability are increased due to weight estimations and center-of-gravity location estimations that are more accurate than manual estimations with curtailments. The location of the center-of-gravity ($X_{CG}$) can be used by a flight computer to set flight information.

Figure 7:
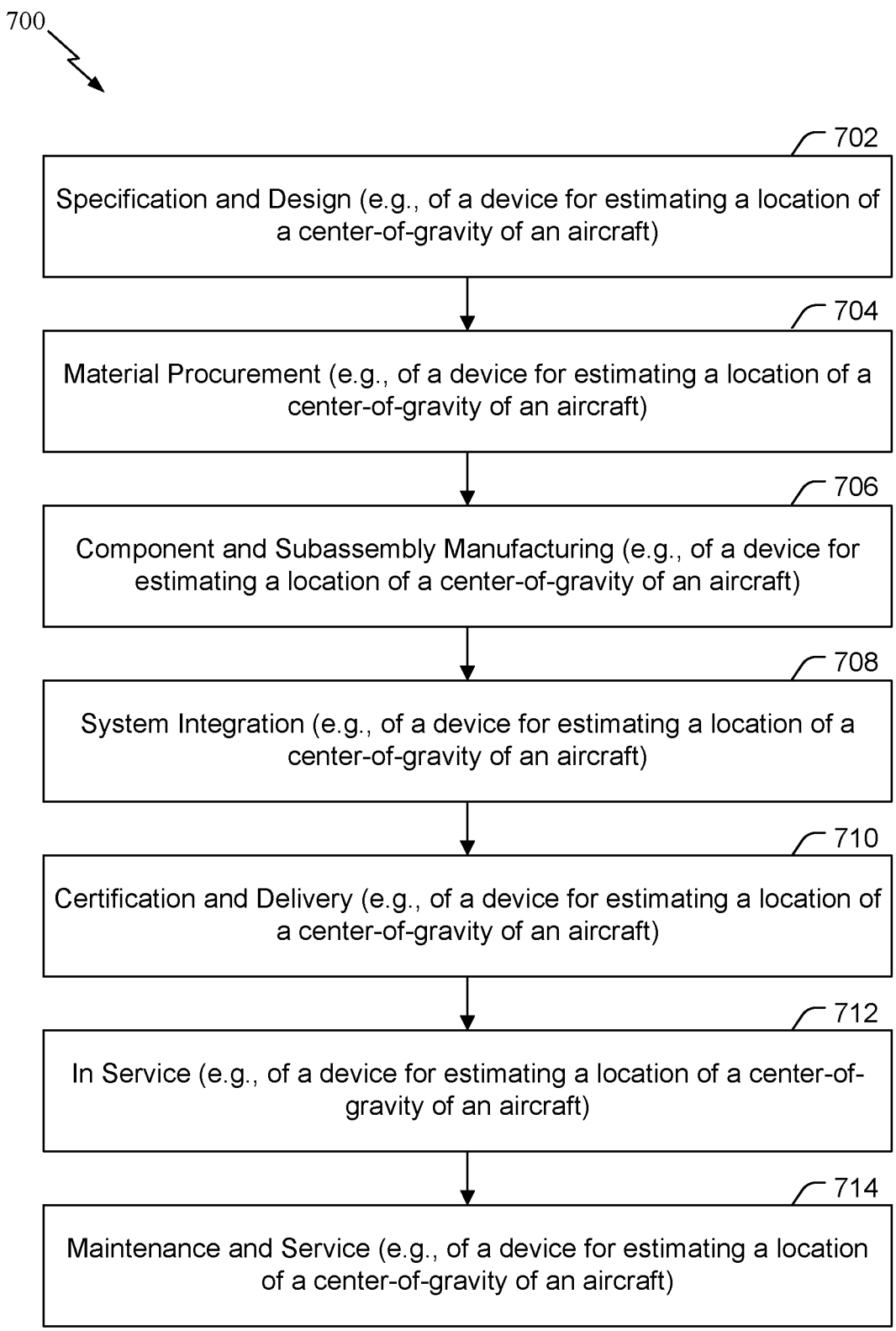
FIG. 7 is a flow chart of a method associated with an aircraft information estimation system.
Figure 8:
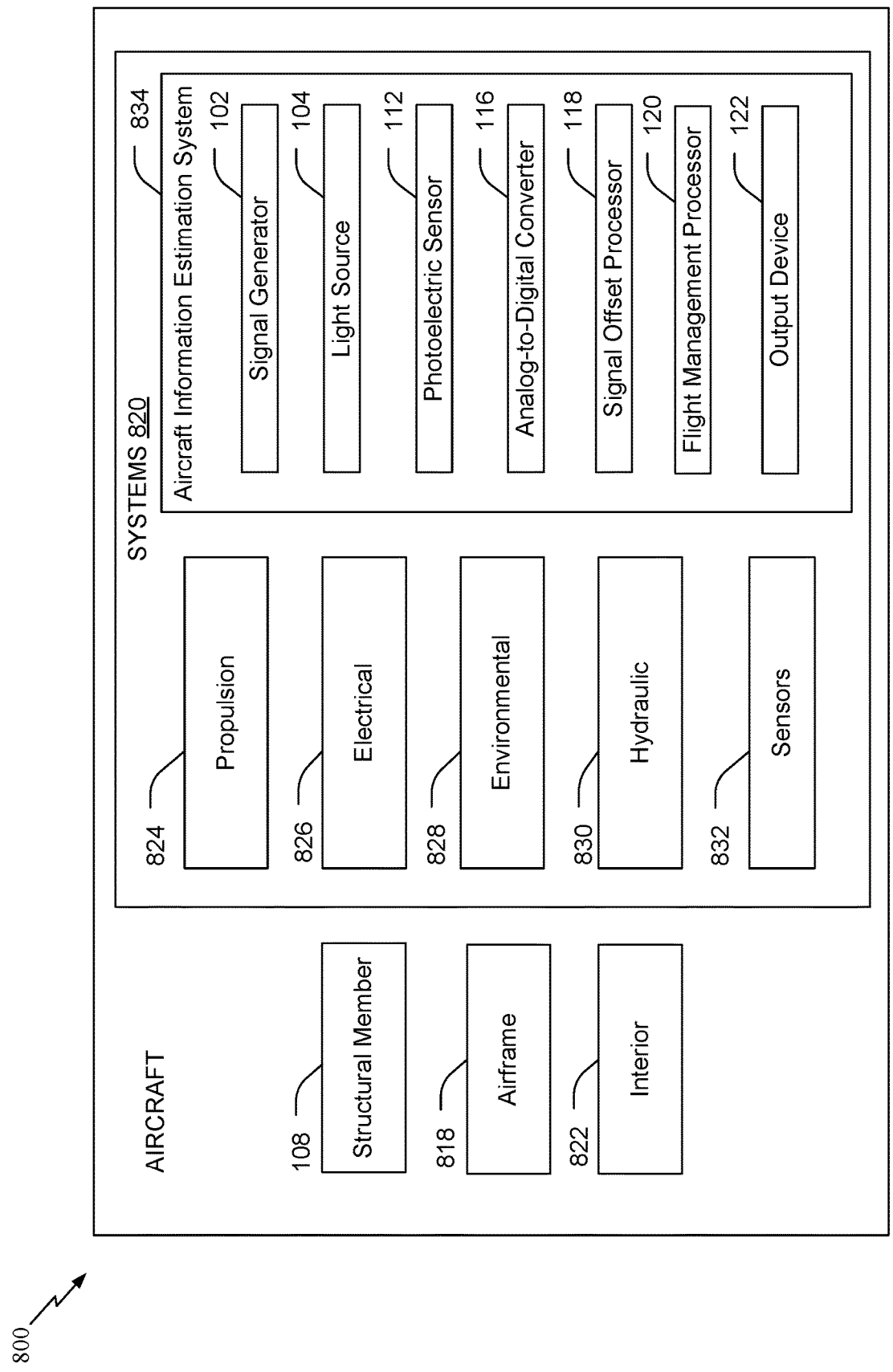
FIG. 8 is a block diagram of an aircraft including an aircraft information estimation system.

Referring to FIGS. 7 and 8, examples of the disclosure are described in the context of an aircraft manufacturing and service method 700 as illustrated by the flow chart of FIG. 7 and the aircraft 300 as illustrated by the block diagram of FIG. 8.

Referring to FIG. 7, a flowchart of an illustrative example of a m300ethod associated with an aircraft information estimation system is shown and designated 700. During pre-production, the exemplary method 700 includes, at 702, specification and design of an aircraft, such as the aircraft 300 of FIG. 3. During the specification and design of the aircraft, the method 700 includes specifying the signal generator 102, the light source 104, the photoelectric sensor 112, the analog-to-digital converter 116, the signal offset processor 118, the flight management processor 120, and the output device 122. At 704, the method 700 includes material procurement. For example, the method 700 may include procuring materials (such as materials for the signal generator 102, the light source 104, the photoelectric sensor 112, the analog-to-digital converter 116, the signal offset processor 118, the flight management processor 120, and the output device 122) for the aircraft information estimation system.

During production, the method 700 includes, at 706, component and subassembly manufacturing and, at 708, system integration of the aircraft. The method 700 may include component and subassembly manufacturing (e.g., the signal generator 102, the light source 104, the photoelectric sensor 112, the analog-to-digital converter 116, the signal offset processor 118, the flight management processor 120, and the output device 122) of the aircraft information estimation system and system integration (e.g., coupling the components) of the aircraft information estimation system. At 710, the method 700 includes certification and delivery of the aircraft and, at 712, placing the aircraft in service. In some implementations, certification and delivery includes certifying the aircraft information estimation system. Placing the aircraft in service may also include placing aircraft information estimation system in service. While in service, the aircraft may be scheduled for routine maintenance and service (which may also include modification, reconfiguration, refurbishment, and so on). At 714, the method 700 includes performing maintenance and service on the aircraft. The method 700 may include performing maintenance and service on the aircraft information estimation system. For example, maintenance and service of the sensor data storage and analysis system may include replacing one or more of the signal generator 102, the light source 104, the photoelectric sensor 112, the analog-to-digital converter 116, the signal offset processor 118, the flight management processor 120, and the output device 122.

Referring to FIG. 8, a block diagram of an illustrative implementation of the aircraft 300 that includes components of an aircraft information estimation system is shown. In at least one implementation, the aircraft 300 is produced by at least a portion of the method 700 of FIG. 7. As shown in FIG. 8, the aircraft 800 includes an airframe 818, the structural member 108, a plurality of systems 820, and an interior 822. Examples of the plurality of systems 820 include one or more of a propulsion system 824, an electrical system 826, an environmental system 828, a hydraulic system 830, and a sensor system 832. The sensor system 832 includes one or more sensors onboard the aircraft 300 and configured to generate sensor data during operation of the aircraft 300. The sensor data indicates one or more parameter values of at least one operational parameter measured by the one or more sensors and one or more timestamps associated with the one or more parameter values.

The aircraft 300 also includes an aircraft information estimation system 834. The aircraft information estimation system 834 includes the signal generator 102, the light source 104, the photoelectric sensor 112, the analog-to-digital converter 116, the signal offset processor 118, the flight management processor 120, and the output device 122.

Any number of other systems may be included in the aircraft 300. Although an aerospace example is shown, the present disclosure may be applied to other industries. For example, the aircraft information estimation system 834 may be used onboard a manned or unmanned aircraft (such as a satellite, a watercraft, or a land-based aircraft), or in a building or other structure.

Apparatus and methods included herein may be employed during any one or more of the stages of the method 700 of FIG. 7. For example, components or subassemblies corresponding to production process 708 may be fabricated or manufactured in a manner similar to components or subassemblies produced while the aircraft 300 is in service, at 712 for example and without limitation. Also, one or more apparatus implementations, method implementations, or a combination thereof may be utilized during the production stages (e.g., stages 702-710 of the method 700), for example, by substantially expediting assembly of or reducing the cost of the aircraft 300. Similarly, one or more of apparatus implementations, method implementations, or a combination thereof may be utilized while the aircraft 300 is in service, at 300 for example and without limitation, to maintenance and service, at 714.

The illustrations of the examples described herein are intended to provide a general understanding of the structure of the various implementations. The illustrations are not intended to serve as a complete description of all of the elements and features of apparatus and systems that utilize the structures or methods described herein. Many other implementations may be apparent to those of skill in the art upon reviewing the disclosure. Other implementations may be utilized and derived from the disclosure, such that structural and logical substitutions and changes may be made without departing from the scope of the disclosure. For example, method operations may be performed in a different order than shown in the figures or one or more method operations may be omitted. Accordingly, the disclosure and the figures are to be regarded as illustrative rather than restrictive.

Moreover, although specific examples have been illustrated and described herein, it should be appreciated that any subsequent arrangement designed to achieve the same or similar results may be substituted for the specific implementations shown. This disclosure is intended to cover any and all subsequent adaptations or variations of various implementations. Combinations of the above implementations, and other implementations not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single implementation for the purpose of streamlining the disclosure. Examples described above illustrate but do not limit the disclosure. It should also be understood that numerous modifications and variations are possible in accordance with the principles of the present disclosure. As the following claims reflect, the claimed subject matter may be directed to less than all of the features of any of the disclosed examples. Accordingly, the scope of the disclosure is defined by the following claims and their equivalents.

What is claimed is:

1. A system comprising:
    a signal generator configured to generate a first electrical signal;
    a light source configured to:
        generate a light beam based on the first electrical signal; and
        direct the light beam towards a structural member of an aircraft;
    a photoelectric sensor configured to:
        receive a reflected light beam, the reflected light beam corresponding to a portion of the light beam reflected from one or more optical reflectors coupled to the structural member; and
        convert the reflected light beam to a second electrical signal; and circuitry configured to estimate a location of a center-of-gravity of the aircraft based on a timing difference between the first electrical signal and the second electrical signal.

2. The system of claim 1, wherein the circuitry includes an analog-to-digital converter unit configured to:
    convert the first electrical signal into a first digital signal having properties of a waveform of the first electrical signal; and convert the second electrical signal into a second digital signal having properties of a waveform of the second electrical signal.

3. The system of claim 2, wherein the circuitry further includes a signal offset processor configured to:
determine a first time that the first digital signal attains a local maximum; and determine a second time that the second digital signal attains a local maximum; and
determine the timing difference based on a difference between the first time and the second time.

4. The system of claim 3, wherein the circuitry further includes a flight management processor that is configured to estimate the location of the center-of-gravity based at least on the timing difference and a weight of the aircraft.

5. A method of obtaining aircraft information, the method comprising: generating a first electrical signal;
generating a light beam based on the first electrical signal, the light beam directed towards a structural member of an aircraft;
converting a reflected light beam to a second electrical signal, the reflected light beam corresponding to a portion of the light beam reflected from one or more optical reflectors coupled to the structural member; and
estimating a location of a center-of-gravity of the aircraft based on a timing difference between the first electrical signal and the second electrical signal.

6. The method of claim 5, wherein an amount of time between generation of the first electrical signal and conversion of the reflected light beam is based on an amount of deflection of the structural member due to a load of the aircraft, and wherein the timing difference is based on the amount of time.

7. The method of claim 5, further comprising:
generating a third electrical signal;
generating a second light beam based on the third electrical signal, the second light beam directed towards a second structural member of the aircraft;
converting a second reflected light beam to a fourth electrical signal, the second reflected light beam corresponding to a portion of the second light beam reflected from second one or more optical reflectors coupled to the second structural member; and
estimating a weight of the aircraft based on the timing difference and a second timing difference between the third electrical signal and the fourth electrical signal.

8. The method of claim 7, wherein the structural member comprises a nose gear of the aircraft, and wherein the second structural member comprises a main landing gear of the aircraft.

9. The method of claim 8, wherein the estimation of the center-of-gravity and the weight is further based on a location of the nose gear and a location of the main landing gear.

10. An aircraft comprising:
a structural member;
a signal generator configured to generate a first electrical signal; a light source configured to:
generate a light beam based on the first electrical signal; and
direct the light beam towards the structural member;
a photoelectric sensor configured to:
receive a reflected light beam, the reflected light beam corresponding to a portion of the light beam reflected from one or more optical reflectors coupled to the structural member; and
convert the reflected light beam to a second electrical signal; and circuitry configured to estimate a location of a center-of-gravity of the aircraft based on a timing difference between the first electrical signal and the second electrical signal.

11. The aircraft of claim 10, wherein the structural member comprises a nose gear of the aircraft.

12. The aircraft of claim 10, wherein the structural member comprises a main landing gear of the aircraft.

13. The aircraft of claim 10, wherein the circuitry includes an analog-to-digital converter configured to:
convert the first electrical signal into a first digital signal having properties of a waveform of the first electrical signal; and
convert the second electrical signal into a second digital signal having properties of a waveform of the second electrical signal.

14. The aircraft of claim 13, wherein the circuitry further includes a signal offset processor configured to:
determine a first time that the first digital signal attains a local maximum; and determine a second time that the second digital signal attains a local maximum; and
determine the timing difference based on a difference between the first time and the second time.

15. The aircraft of claim 14, wherein the circuitry further includes a flight management processor that is configured to estimate the location of the center-of-gravity based at least on the timing difference and a weight of the aircraft.

16. The aircraft of claim 15, wherein the timing difference and the weight of the aircraft are inputs to a look-up table used to estimate the location of the center-of-gravity.

17. The aircraft of claim 14, further comprising:
a second structural member;
a second signal generator configured to generate a third electrical signal;
a second light source configured to:
generate a second light beam based on the third electrical signal; and direct the second light beam towards the second structural member; and
a second photoelectric sensor configured to:
receive a second reflected light beam, the second reflected light beam corresponding to a portion of the second light beam reflected from second one or more optical reflectors coupled to the second structural member; and
convert the second reflected light beam to a fourth electrical signal, wherein the circuitry is further configured to estimate a weight of the aircraft based on the timing difference and a second timing difference between the third electrical signal and the fourth electrical signal.

18. The aircraft of claim 17, wherein the circuitry further includes a second analog-to-digital converter unit configured to:
convert the third electrical signal into a third digital signal having properties of a waveform of the third electrical signal; and
convert the fourth electrical signal into a fourth digital signal having properties of a waveform of the fourth electrical signal.

19. The aircraft of claim 18, wherein the circuitry further includes a second signal offset processor configured to:
determine a third time that the third digital signal attains a local maximum;
determine a fourth time that the fourth digital signal attains a local maximum; and
determine the second timing difference based on a difference between the third time and the fourth time.

20. The aircraft of claim 19, wherein the circuitry further includes a flight management processor that is configured to:
    estimate the location of the center-of-gravity based on the timing difference and the second timing difference; and
    estimate the weight based on the timing difference and the second timing difference.

\* \* \* \* \*